United States Patent
Matsumoto

(10) Patent No.: US 12,111,595 B2
(45) Date of Patent: Oct. 8, 2024

(54) OPTICAL SCANNING DEVICE, IMAGE FORMING APPARATUS, AND CONTROL METHOD FOR PROPER INITIALIZATION OF LASER DRIVER

(71) Applicant: SHARP KABUSHIKI KAISHA, Sakai (JP)

(72) Inventor: Kazutaka Matsumoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/120,945

(22) Filed: Mar. 13, 2023

(65) Prior Publication Data
US 2023/0305466 A1    Sep. 28, 2023

(30) Foreign Application Priority Data
Mar. 22, 2022    (JP) .................. 2022-045771

(51) Int. Cl.
*G03G 15/04*    (2006.01)
*G02B 26/12*    (2006.01)
*G03G 15/00*    (2006.01)

(52) U.S. Cl.
CPC ....... *G03G 15/5004* (2013.01); *G02B 26/123* (2013.01)

(58) Field of Classification Search
USPC ........................................................ 399/67
See application file for complete search history.

(56) References Cited

U.S. PATENT DOCUMENTS

| | | | | |
|---|---|---|---|---|
| 6,504,147 | B1 * | 1/2003 | Ito | H04N 1/0414 |
| | | | | 250/234 |
| 2007/0285713 | A1 * | 12/2007 | Yamamoto | G03G 15/5004 |
| | | | | 358/1.15 |
| 2011/0102873 | A1 | 5/2011 | Wada | |

FOREIGN PATENT DOCUMENTS

JP    2011-098494 A    5/2011

* cited by examiner

*Primary Examiner* — Quana Grainger
(74) *Attorney, Agent, or Firm* — ScienBiziP, P.C.

(57) ABSTRACT

An optical scanning device includes a light emitter, a driver, and a signal outputter. The light emitter emits a laser beam. The driver operates, depending on a signal inputted thereto, in a master state in which the driver performs initialization by reading data from a storage device or in a slave state in which the driver drives the light emitter according to an operation mode corresponding to the signal. The signal outputter outputs the signal to the driver. For the initialization of the driver, the signal outputter outputs a signal for setting the driver to the slave state and setting the operation mode to a specific operation mode. The driver performs the initialization based on a beam intensity of the laser beam emitted from the light emitter driven according to the operation mode based on the signal outputted from the signal outputter.

5 Claims, 10 Drawing Sheets

OPTICAL SCANNING DEVICE, IMAGE FORMING APPARATUS, AND CONTROL METHOD FOR PROPER INITIALIZATION OF LASER DRIVER

BACKGROUND OF THE INVENTION

Field of the Invention

The present disclosure relates to an optical scanning device and the like.

Description of the Background Art

Some image forming apparatuses perform a light exposure process for forming an electrostatic latent image on a surface of a photoreceptor by scanning the surface of the photoreceptor with a laser beam. Some technologies have been proposed to control a laser diode (light emitting element) that is used to perform the light exposure process.

For example, a technology has been proposed to perform feedback control of drive current for a semiconductor laser in a stable manner by storing, in non-volatile memory, gain of detection output of a light receiving element that is used for the feedback control for the semiconductor laser (see, for example, conventional art).

Generally, a laser diode driver (LDD; also referred to below simply as "a laser driver") is used to control a laser diode. Such laser drivers include a digital laser driver that operates as a master during initialization to perform initialization (for example, setting of bias current) based on data read from EEPROM and that operates as a slave during a normal operation. A function of automatically setting a laser driver is generally referred to as automatic power control (APC). The use of such a laser driver in an optical scanning device allows for implementation of an automatic bias current setting function and a shading correction function through digital computation, and helps reduce external components and cost as well as improve image quality.

However, the initialization of the laser driver requires EEPROM and a harness dedicated to the laser driver, leading to an increase in cost and an increase in substrate area. Such a problem is not considered in conventional art.

In view of the above-described problem, an object of the present disclosure is to provide an optical scanning device and the like that makes it possible to perform initialization appropriately.

SUMMARY OF THE INVENTION

In order to solve the above-described problem, an optical scanning device according to an aspect of the present disclosure includes: a light emitter that emits a laser beam; a driver that operates, depending on a signal inputted thereto, in a master state in which the driver performs initialization by reading data from a storage device or in a slave state in which the driver drives the light emitter according to an operation mode corresponding to the signal; and a signal outputter that outputs the signal to the driver, wherein for the initialization of the driver, the signal outputter outputs a signal for setting the driver to the slave state and setting the operation mode to a specific operation mode, and the driver performs the initialization based on a beam intensity of the laser beam emitted from the light emitter driven according to the operation mode based on the signal outputted from the signal outputter.

An image forming apparatus according to another aspect of the present disclosure includes: a light emitter that emits a laser beam; a driver that operates, depending on a signal inputted thereto, in a master state in which the driver performs initialization by reading data from a storage device or in a slave state in which the driver drives the light emitter according to an operation mode corresponding to the signal; a signal outputter that outputs the signal to the driver; an image carrier that carries an electrostatic latent image formed as a result of the image carrier being irradiated with the laser beam; and a fixer that fixes, onto recording paper, an image based on the electrostatic latent image, wherein for the initialization of the driver, the signal outputter outputs a signal for setting the driver to the slave state and setting the operation mode to a specific operation mode, and the driver performs the initialization based on a beam intensity of the laser beam emitted from the light emitter driven according to the operation mode based on the signal outputted from the signal outputter.

A control method according to another aspect of the present disclosure is a control method for a driver device that operates, depending on a signal inputted thereto, in a master state in which the driver device performs initialization by reading data from a storage device or in a slave state in which the driver device drives a light emitter, which emits a laser beam, according to an operation mode corresponding to the signal, the control method including: outputting, for the initialization of the driver device, a signal for setting the driver device to the slave state and setting the operation mode to a specific operation mode; and causing the driver device to perform the initialization based on a beam intensity of the laser beam emitted from the light emitter driven according to the operation mode based on the signal outputted.

According to the present disclosure, it is possible to provide an optical scanning device and the like that makes it possible to perform initialization appropriately.

DESCRIPTION OF THE PREFERRED EMBODIMENTS

The following describes embodiments for carrying out the present disclosure with reference to the accompanying drawings. Note that the following embodiments are merely examples for describing the present disclosure, and the technical scope of the disclosure set forth in the claims is not limited to the description given below.

1. First Embodiment

The following describes, as a first embodiment, a case where an optical scanning device according to the present disclosure is mounted in an image forming apparatus 10. The image forming apparatus 10 is an information processing apparatus that has a copy function, a scan function, a document print function, and the like, and is also referred to as a multi-function printer/peripheral (MFP).

Figure 1:
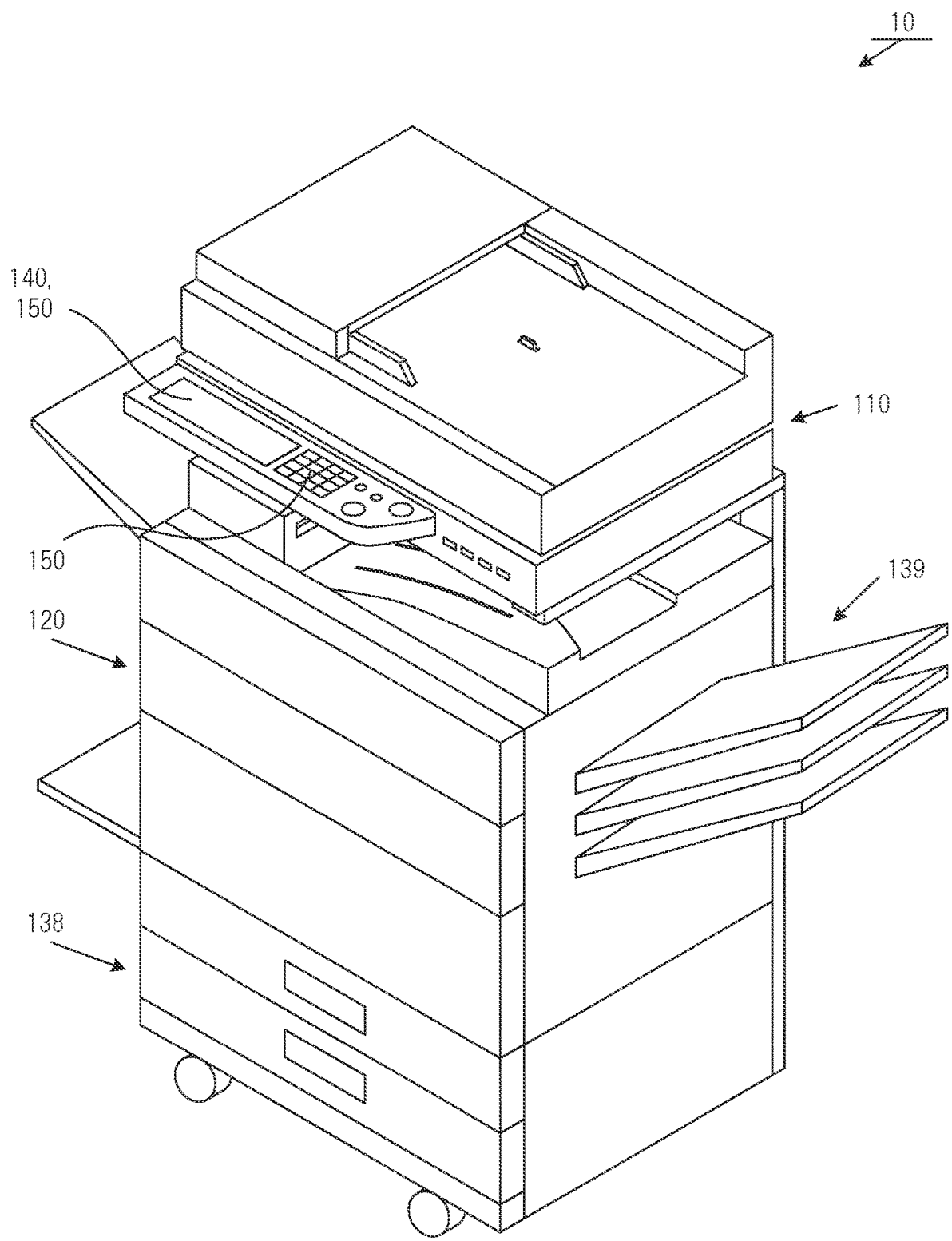
FIG. 1 is a perspective view of an image forming apparatus according to a first embodiment.

1.1 Functional Configuration
1.1.1 Functional Configuration of Image Forming Apparatus
The following describes a functional configuration of the image forming apparatus 10 according to the present embodiment. FIG. 1 is an external perspective view of the image forming apparatus 10, and FIG. 2 is a block diagram illustrating the functional configuration of the image forming apparatus 10.

Figure 2:
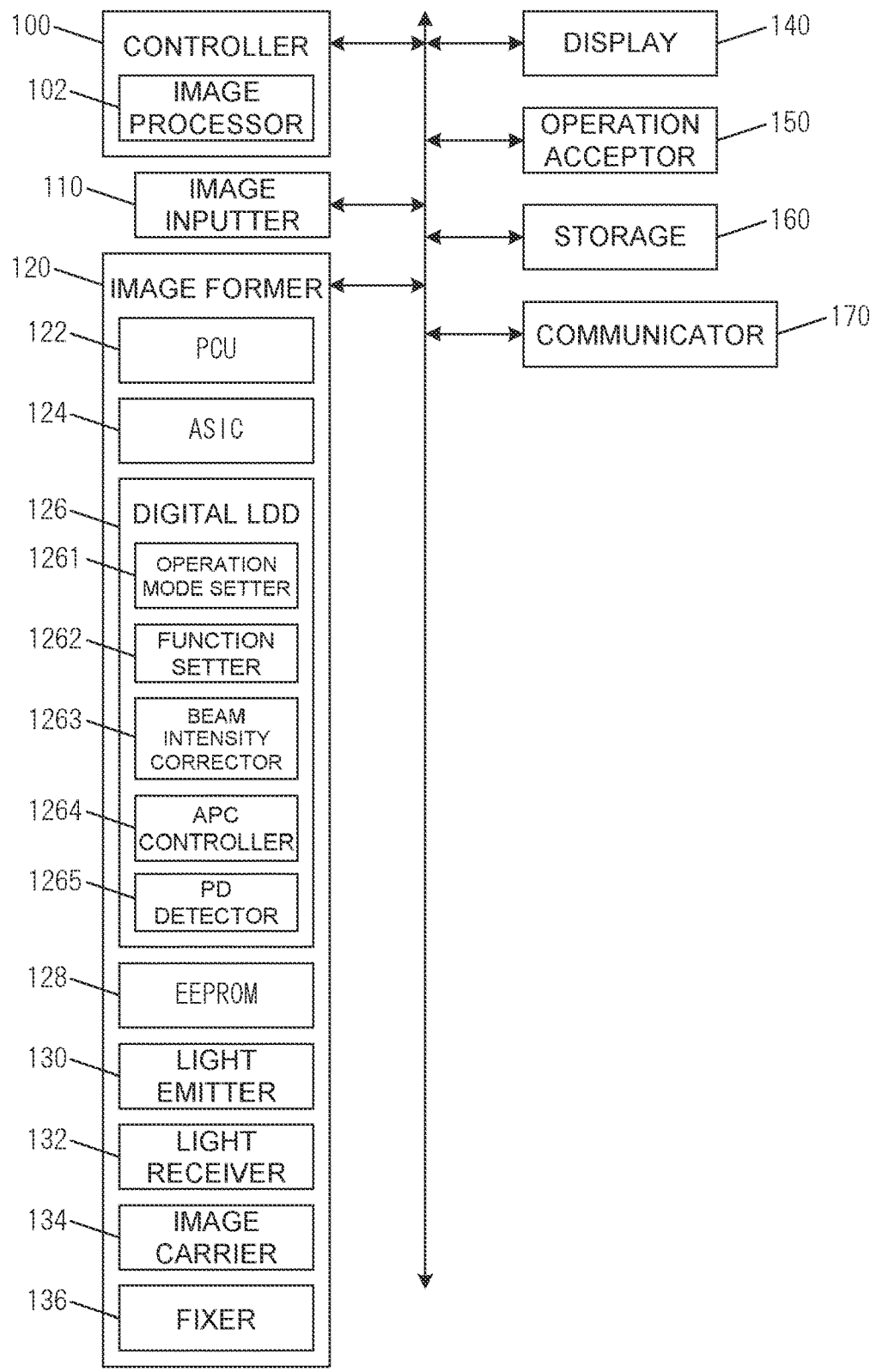
FIG. 2 is a block diagram illustrating a functional configuration of the image forming apparatus according to the first embodiment.

As illustrated in FIG. 2, the image forming apparatus 10 includes a controller 100, an image inputter 110, an image former 120, a display 140, an operation acceptor 150, a storage 160, and a communicator 170.

The controller 100 is a functional element that performs overall control of the image forming apparatus 10. The controller 100 reads and executes various programs stored in the storage 160 to implement various functions, and includes, for example, one or more central processing units (CPUs). The controller 100 may be configured as a system on a chip (SoC) having a plurality of functions among those described below.

The controller 100 functions as an image processor 102 by executing a program stored in the storage 160. The image processor 102 performs various image-related processes. For example, the image processor 102 performs a sharpening process and a tone conversion process on an image inputted through the image inputter 110.

The image inputter 110 inputs an image to the image forming apparatus 10. For example, the image inputter 110 includes, for example, a scanner device that reads a document placed on a document table. The scanner device converts, for example, the image into an electrical signal using an image sensor such as a charge coupled device (CCD) or a contact image sensor (CIS), and quantizes and encodes the electrical signal. Note that the image inputter 110 may include, for example, an automatic document feeder (single pass feeder, SPF) and a scanner device that reads an image of a document fed by the automatic document feeder.

The image former 120 forms (prints) the image on a recording medium such as recording paper. The image former 120 includes, for example, a printing device such as an electrophotographic laser printer. For example, the image former 120 feeds the recording paper from a paper feed tray 138 shown in FIG. 1, forms the image on a surface of the recording paper, and discharges the recording paper onto a paper discharge tray 139.

The image former 120 includes a process control unit (PCU) 122, an application specific integrated circuit (ASIC) 124, a digital laser diode driver (LDD) 126, electrically erasable programmable read-only memory (EEPROM) 128, a light emitter 130, a light receiver 132, an image carrier 134, and a fixer 136.

The PCU 122 controls an image formation process. For example, the PCU 122 controls and monitors movement of a motor, a sorter, and other devices related to conveyance and the like of recording paper based on the control of the controller 100. The PCU 122 also controls the ASIC 124 by transmitting predetermined data and signals to the ASIC 124. The PCU 122 includes, for example, a substrate and a circuit.

The ASIC 124 controls the digital LDD 126 based on the control of the PCU 122. The ASIC 124 controls the digital LDD 126 by transmitting (outputting) predetermined data and signals to the digital LDD 126. That is, the ASIC 124 is a signal outputter that outputs signals to the digital LDD 126.

The digital LDD 126 drives the light emitter 130, which is a laser diode (LD). That is, the digital LDD 126 is a driver that drives the light emitter 130. The digital LDD 126 also makes a setting of current (LD current, drive current) to be outputted to drive the light emitter 130 and a setting of bias current as settings for driving the light emitter 130.

The digital LDD 126 may implement a digital automatic power control (APC) function of maintaining optical output (LD beam intensity) of the light emitter 130 at a constant level. The digital LDD 126 may also include a register for storing data. The digital LDD 126 includes, for example, a substrate and a circuit. A detailed configuration of the digital LDD 126 is described below.

The EEPROM 128 is rewritable read-only memory. The EEPROM 128 stores therein data related to settings and the like of the digital LDD 126. The data related to settings and the like of the digital LDD 126 is prestored in the EEPROM 128. Note that the data stored in the EEPROM 128 may be rewritable by service personnel, for example.

The light emitter 130 is a light emitting element that emits a laser beam. The light emitter 130 includes, for example, a laser diode (LD) that increases or decreases its optical output in proportion to the amount of an excess of inputted current over the bias current. According to the present embodiment, the light emitter 130 is connected to the digital LDD 126 and emits a laser beam based on the current outputted from the digital LDD 126. That is, the light emitter 130 emits a laser beam based on the control of the digital LDD 126.

The light receiver 132 is a light receiving element that receives light. The light receiver 132 includes, for example, a photodiode (PD) that receives incoming light and outputs a received light signal (for example, current) based on the intensity of the received light. According to the present embodiment, the light receiver 132 is provided in the vicinity of the light emitter 130 to receive the laser beam emitted by the light emitter 130 and output a current corresponding to the intensity of the received laser beam.

The image carrier 134 is charged and irradiated with the laser beam emitted by the light emitter 130 to form an electrical latent image (electrostatic latent image) thereon. The image carrier 134 is a so-called photoreceptor (photoreceptor drum). Toner is applied to the image carrier 134, and then the image carrier 134 transfers the image onto recording paper by transferring the toner onto the recording paper.

The fixer 136 fixes (fuses) the toner (image based on the electrostatic latent image) transferred onto the recording paper. The fixer 136 includes, for example, a fixing roller and a pressure roller.

The display 140 displays various information. The display 140 includes, for example, a display device such as a liquid crystal display (LCD), an organic electro-luminescence (EL) display, or a micro light emitting diode (LED) display.

The operation acceptor 150 receives an operation instruction from a user who is using the image forming apparatus 10. The operation acceptor 150 includes an input device such as a key switch (hard key) or a touch sensor. The touch sensor may detect, for example, an input through a contact (touch) by a common detection method such as a resistive method, an infrared method, an inductive method, or a capacitive method. Note that the image forming apparatus 10 may have a touch panel obtained by integrating the display 140 and the operation acceptor 150 into one unit.

The storage 160 stores therein various programs necessary for operation of the image forming apparatus 10 and various types of data. The storage 160 includes, for example, a storage device such as a solid state drive (SSD), which is semiconductor memory, or a hard disk drive (HDD).

The communicator 170 communicates with an external device via a local area network (LAN) or a wide area network (WAN). The communicator 170 may include, for example, a communication module or a communication device such as a network interface card (NIC) that is used in a wired/wireless LAN, and have an interface connectable to a network. The communicator 170 may be connected to a communication network such as a public network, a LAN, or the Internet, and may be capable of transmitting data externally by facsimile, e-mail, or other communication methods via the communication network.

1.1.2 Functional Configuration of Digital LDD

Figure 3:
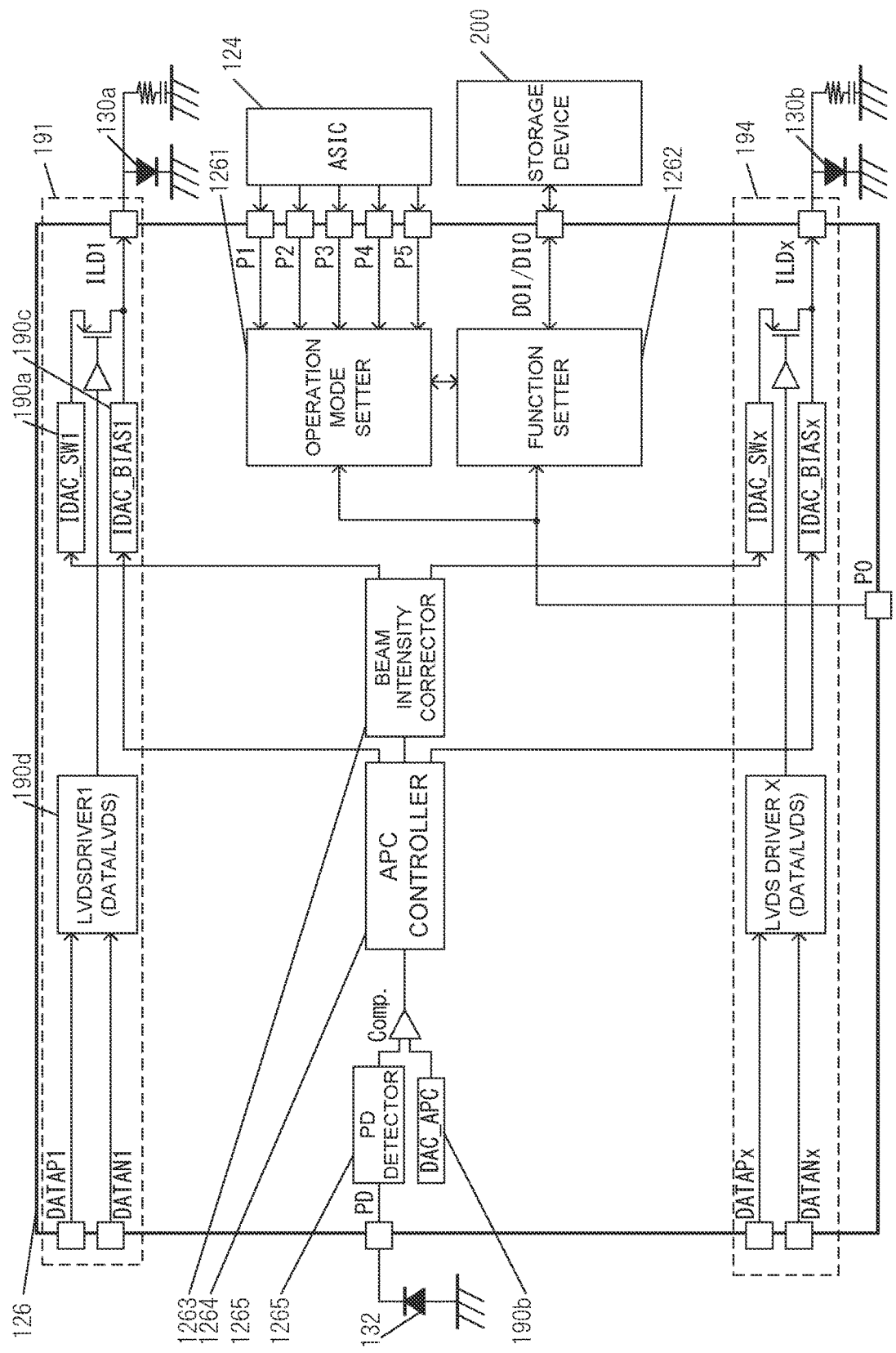
FIG. 3 is a block diagram of a digital LDD according to the first embodiment.

As illustrated in FIG. 2, the digital LDD 126 according to the present embodiment includes an operation mode setter 1261, a function setter 1262, a beam intensity corrector 1263, an APC controller 1264, and a PD detector 1265. FIG. 3 is a block diagram of the digital LDD 126.

In FIG. 3, DATAP1, DATAN1, DATAPx, DATANx, ILD1, ILDx, P0, P1, P2, P3, P4, P5, DOI/DIO, and PD each indicate a pin (interface) for inputting and outputting signals (for example, voltage and current) to and from an external device. The following describes the pins.

(1) DATAP1, DATAN1, DATAPx, and DATANx

DATAPx and DATANx are each a pin for inputting data (low voltage differential signaling, LVDS) corresponding to a channel x.

The channel (also referred to as CH) refers to an interface for outputting a drive current (LD current) to be supplied to a corresponding light emitter 130 (LD) to cause the light emitter 130 to emit a laser beam. For example, DATAP1 and DATAN1 are each a pin for inputting data to CH1.

Note that the digital LDD 126 may have a plurality of channels. The present embodiment is described on the assumption that the digital LDD 126 has four channels. That is, the digital LDD 126 has DATAPx (x is any value from 1 to 4) and DATANx (x is any value from 1 to 4) as pins for inputting data.

(2) ILD1 and ILDx

ILDx is a pin for outputting the LD current in the channel x based on the data inputted from DATAPx and DATANx.

(3) DOI/DIO

DOI/DIO is a pin for inputting and outputting data to and from a storage device (for example, a storage device 200 shown in FIG. 3) external to the digital LDD 126. The storage device external to the digital LDD 126 is, for example, EEPROM.

(4) P0, P1, P2, P3, P4, and P5

P0 is a pin for setting a state of the digital LDD 126. P1, P2, P3, P4, and P5 are each a pin (parallel interface) for setting an operation mode of the digital LDD 126.

Either a voltage H having a high voltage level or a voltage L having a voltage level lower than H is inputted as a signal to P0 to P5. In the following description, Pn (n is any value from 0 to 5) to which L is being inputted is described as Pn=L, and Pn to which H is being inputted is described as Pn=H.

The present embodiment is described on the assumption that the digital LDD 126 operates in one of two states, that is, in a slave state or in a master state. The digital LDD 126 is in the slave state when P0=L and in the master state when P0=H.

The slave state refers to a state in which the digital LDD 126 operates according to an operation mode set depending on signals inputted to P1, P2, P3, P4, and P5, and the digital LDD 126 drives the light emitters 130 connected thereto. The operation mode refers to a mode that indicates an operation to be performed by the digital LDD 126 when the digital LDD 126 is in the slave state. That is, when in the slave state, the digital LDD 126 performs a predetermined operation such as an operation of driving the light emitters 130 according to externally inputted signals. Examples of predetermined operations include an operation of outputting an LD current from each channel (ILDx) according to data (LVDS) corresponding to the channel and an operation of outputting an LD current according to the operation mode. That is, when in the slave state, the digital LDD 126 performs a normal operation as a laser diode driver.

Note that P1 is a pin for inputting a signal for setting whether or not to enable the digital LDD 126 (enable signal).

P2 is a pin for inputting a signal for toggling whether or not to perform the APC (non-APC mode setting signal). P2=H indicates that the APC is not performed (non-APC), and P2=L indicates that the APC is performed.

P3 and P4 are each a pin for inputting a signal for specifying a channel to perform the APC (channel specifying signal).

P5 is a pin for inputting a signal for switching the operation mode of the digital LDD 126 between an APC-H mode and an APC-L mode (APC mode switching signal).

The operation mode is set by the operation mode setter 1261 described below. Operation modes to be set by the operation mode setter 1261, and the APC-H and APC-L modes are described below.

The master state refers to a state in which the digital LDD 126 performs initialization (initial setting) of the digital LDD 126 by reading data from a storage device (for example, the storage device 200 shown in FIG. 3) external to the digital LDD 126 and executing an initial APC sequence according to the read data. The initialization means that the digital LDD 126 makes various settings so that the digital LDD 126 appropriately drives the light emitters 130. In the initialization, for example, the digital LDD 126 adjusts the LD beam intensity and sets the bias current. When in the master state, the digital LDD 126 actively executes the initial APC sequence, regardless of the operation mode set depending on the signals inputted to P1 to P5.

The initial APC sequence refers to a sequence for performing per-channel initialization (for example, setting of the LD current and the bias current) in the order of CH1, CH2, CH3, and CH4. Note that when executing the initial APC sequence, the digital LDD 126 may also store values in the register based on data acquired from the storage device external to the digital LDD 126.

As described above, when in the master state, the digital LDD 126 performs the initialization (startup operation) of the digital LDD 126 by executing the initial APC sequence. After the digital LDD 126 has finished executing the initial APC sequence, the digital LDD 126 is set to the slave state (P0=L) to perform a normal operation.

(5) PD

PD is a pin for inputting a current outputted from the light receiver 132.

The following describes functional elements that form the digital LDD 126. The operation mode setter 1261 sets the operation mode of the digital LDD 126 based on the signals inputted to the pins P1 to P5, except when the digital LDD 126 is in the master state or in a reset state (until the digital LDD 126 is ready to accept externally inputted signals after power-on). The signals to be inputted to the pins P1 to P5 are outputted from the ASIC 124. As described above, the digital LDD 126 is controlled by the ASIC 124.

The operation modes to be set by the operation mode setter 1261 include the following operation modes.
(1) DISABLE (disabled) mode
(2) CH1 initialization mode
(3) CH2 initialization mode
(4) CH3 initialization mode
(5) CH4 initialization mode
(6) OFF mode The following describes each of the operation modes.

(1) DISABLE (Disabled) Mode

The DISABLE mode refers to a mode in which output current is cut off in all the channels of the digital LDD 126. The DISABLE mode is set when P1=L. In this case, the digital LDD 126 does not output current from any of the channels, regardless of the input to P2 to P5 and input of data (LVDS).

(2) CH1 Initialization Mode

The CH1 initialization mode refers to a mode in which the initialization of CH1 is performed. The initialization of CH1 means adjustment of the LD beam intensity and setting of the bias current that are related to CH1. The CH1 initialization mode is set when P1=H, P2=L, P3=L, and P4=L.

In particular, when P5=H, the operation mode setter 1261 sets the operation mode of the digital LDD 126 to the APC-H mode for CH1 (first operation mode). When P5=L, the operation mode setter 1261 sets the operation mode of the digital LDD 126 to the APC-L mode for CH1 (second operation mode). That is, the CH1 initialization mode corresponds to a case where the operation mode of the digital LDD 126 is either an APC-H1 mode or an APC-L1 mode.

Note that the APC-H mode for CHx is referred to as an APC-Hx mode (x is any value from 1 to 4), and the APC-L mode for CHx is referred to as an APC-Lx mode (x is any value from 1 to 4).

In the APC-Hx mode, the digital LDD 126 controls output current of IDAC_SW for CHx (IDAC_SWx) so that the beam intensity of the light emitter 130 (LD) connected to ILDx is a preset target beam intensity (first beam intensity). IDAC_SW is a circuit for adjusting output of switching current. The digital LDD 126 also sets the bias current and the switching current based on a convergence value in the immediately preceding APC-Hx mode (digital convergence value of the LD current) and a convergence value in the immediately preceding APC-Lx mode. That is, the digital LDD 126 performs a specific APC sequence for CHx.

By executing the specific APC sequence, the digital LDD 126 drives the light emitter 130 connected to CHx, so that the thus driven light emitter 130 emits a laser beam. The digital LDD 126 also changes settings of IDAC_SWx and IDAC_BIAS for CHx (IDAC_BIASx) based on the beam intensity of the emitted laser beam. Note that IDAC_BIAS is a circuit for adjusting output of the bias current.

On the other hand, in the APC-Lx mode, the digital LDD 126 controls output current of IDAC_SWx so that the beam intensity of the light emitter 130 (LD) connected to ILDx is smaller (second beam intensity) than the beam intensity in the APC-Hx mode. The beam intensity in the APC-Lx mode is, for example, a beam intensity equivalent to $P_0/3$, where $P_0$ is the beam intensity in the APC-Hx mode.

Through the operation mode of the digital LDD 126 being switched to the APC-Hx mode or the APC-Lx mode, a predetermined current is outputted to the light emitter 130 connected to ILDx, and a laser beam is emitted from the light emitter 130 connected to ILDx. The digital LDD 126 also detects the beam intensity of the emitted laser beam. Based on the detected beam intensity, the beam intensity corrector 1263 and the APC controller 1264 described below operate to set the LD beam intensity, the bias current, and the like.

Figure 4:
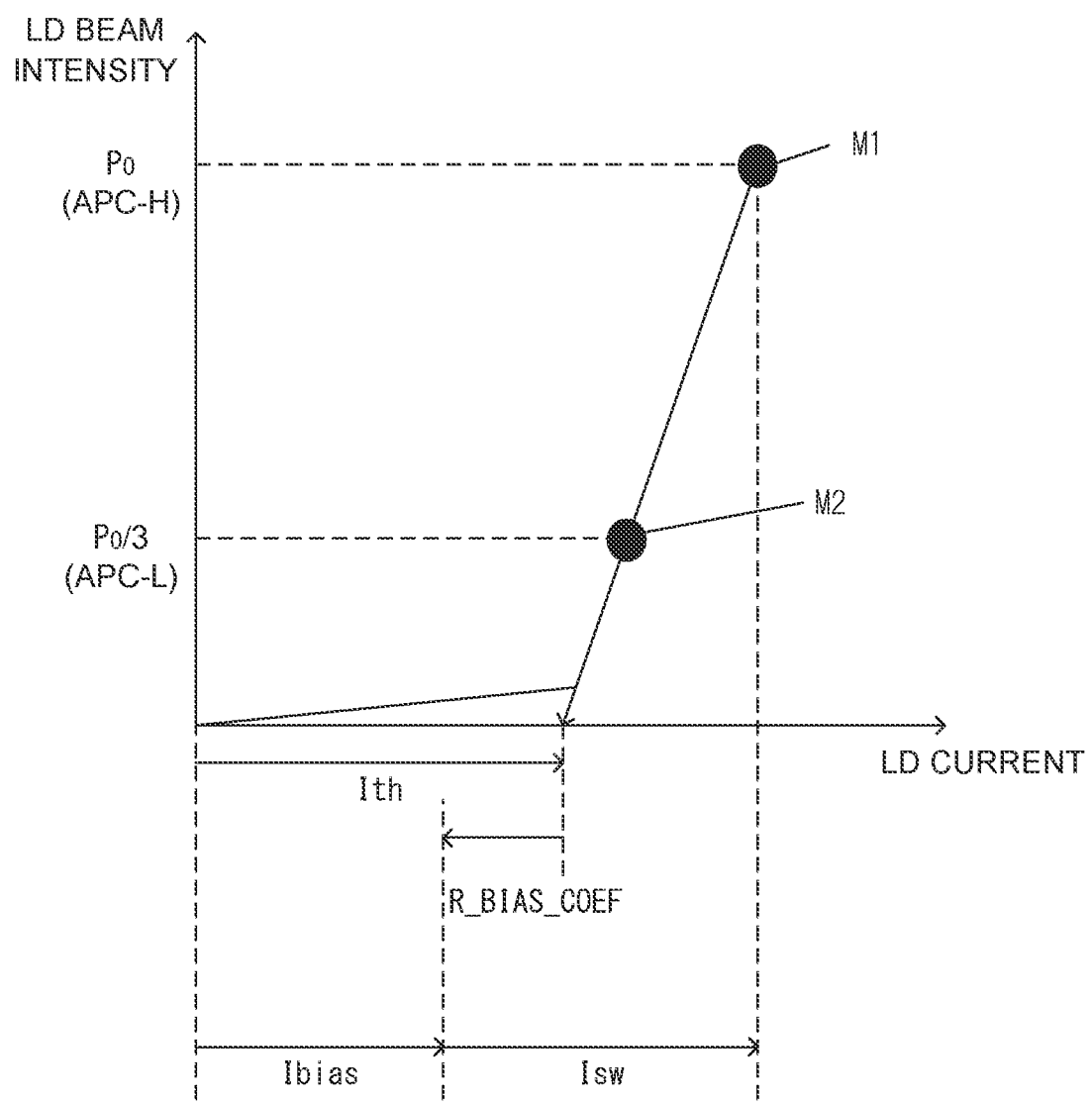
FIG. 4 is a diagram showing I-P characteristics of a laser diode (LD).

FIG. 4 is a diagram showing I-P characteristics of the laser diode (LD) forming the light emitter 130 in a case where the operation mode of the digital LDD 126 is switched between the APC-H mode and the APC-L mode. The horizontal axis in FIG. 4 represents LD current, and the vertical axis in FIG. 4 represents LD beam intensity.

M1 in FIG. 4 is an intersection of a value ($P_0$) of the LD current inputted to the light emitter 130 with a value of the LD beam intensity in the APC-H mode. M2 in FIG. 4 is an intersection of a value ($P_0/3$) of the LD current inputted to the light emitter 130 with a value of the LD beam intensity in the APC-L mode. The digital LDD 126 estimates an intersection of an axis of the LD current with a straight line passing through M1 and M2 as a threshold current Ith of the light emitter 130 of interest.

The digital LDD 126 also sets the bias current (Ibias) based on the estimated threshold current Ith and a value preset in the register R_BIAS_COEF of the digital LDD 126 (code value corresponding to Ith-Ibias).

H and L are alternately and repeatedly inputted to P5. Accordingly, the operation mode of the digital LDD 126 is switched between the APC-H mode for CH1 (APC-H1) and the APC-L mode for CH1 (APC-L1), and thus the initialization of CH1 is performed. As the operation mode of the digital LDD 126 is switched between APC-H1 and APC-L1 multiple times, the light emitter 130 is driven, and the LD beam intensity, the bias current, and the like are set multiple times, i.e., each time the operation mode is switched, according to the beam intensity of the light emitter 130. The digital LDD 126 can bring the values of the bias current and the like closer to values to be set in the master state by setting the values of the bias current and the like multiple times. As described above, the digital LDD 126 can set the bias current and the like for a specific channel to appropriate values even when the digital LDD 126 is in the slave state by switching the operation mode depending on the signals outputted by the ASIC 124.

(3) To (5) CH2 Initialization Mode, CH2 Initialization Mode, and CH4 Initialization Mode The CH2 initialization mode refers to a mode for performing initialization of CH2. The CH2 initialization mode is set when P1=H, P2=L, P3=L, and P4=H. In this case, H and L are alternately and repeatedly inputted to P5. Accordingly, the operation mode of the digital LDD 126 is switched between the APC-H mode for CH2 (APC-H2) and the APC-L mode for CH2 (APC-L2), and thus the initialization of CH2 is performed.

When P1=H, P2=L, P3=H, and P4=L, the operation mode is set to the CH3 initialization mode. When P1=H, P2=L, P3=H, and P4=H, the operation mode is set to the CH4 initialization mode.

(6) OFF (Standby) Mode

The OFF mode refers to a mode in which an LD current is outputted from the digital LDD 126 according to data (LVDS) inputted or the digital LDD 126 waits for input of data. The OFF mode is set when P1=H and P2=H.

The function setter 1262 reads data from the external EEPROM and performs the initialization of the digital LDD 126 (for example, setting of a target beam intensity) when the digital LDD 126 is in the master state.

The beam intensity corrector 1263 inputs the convergence value in the APC-Hx mode, generates a signal for changing the setting of IDAC_SWx (190*a* in FIG. 3), and outputs the generated signal to IDAC_SWx. Through the above, the beam intensity corrector 1263 corrects the LD beam intensity of the light emitter 130 connected to CHx. Note that the beam intensity corrector 1263 may perform shading correction for correcting the LD beam intensity in a main scanning direction on a destination of LD light irradiation.

The APC controller 1264 controls the execution of the APC and sets the bias current. The APC controller 1264 inputs a result of a comparison between a voltage outputted from the PD detector 1265 and a voltage indicating an APC target value to be outputted from DAC_APC (190*b* in FIG. 3), sets the bias current, and generates a signal for changing the setting of IDAC_BIASx (190*c* in FIG. 3). The APC controller 1264 also outputs the generated signal to IDAC_BIASx. Through the above, the APC controller 1264 sets the bias current.

The PD detector 1265 inputs a current outputted from the light receiver 132 and detects the beam intensity. The PD detector 1265 also outputs a voltage according to the detected beam intensity.

The following describes a flow of current output from ILD1. First, LVDS driver 1 (190*d* in FIG. 3) outputs an LD current based on a voltage inputted from DATAP1 and DATAN1.

IDAC_BIAS1 sets the bias current to output as a result of input of a signal outputted from the APC controller 1264 and outputs the predetermined bias current. IDAC_SW1 sets the switching current to output as a result of input of a signal outputted from the beam intensity corrector 1263 and outputs the predetermined switching current.

Ild1, which is a current based on the LD current outputted from LVDS driver 1, the bias current outputted from IDAC_BIAS1, and the switching current outputted from IDAC_SW1, is outputted from ILD1. The current Ild1 is inputted to the light emitter 130 (light emitter 130*a*) connected to CH1. As a result, a laser beam is emitted from the light emitter 130*a*. As described above, a current is outputted from ILD1 through elements of a configuration 191 in FIG. 3.

The same applies to CH2 to CH4. That is, Ildx, which is a current based on the LD current outputted from LVDS driver x, the bias current outputted from IDAC_BIASx, and the switching current outputted from IDAC_SWx, is outputted from ILDx as shown in a configuration 194 in FIG. 3.

Note that the digital LDD 126 may be a digital laser driver that performs digital control to control the operation mode setter 1261, the function setter 1262, the beam intensity corrector 1263, and the APC controller 1264.

1.1.3 Configuration of Optical Scanning Device

Figure 5:
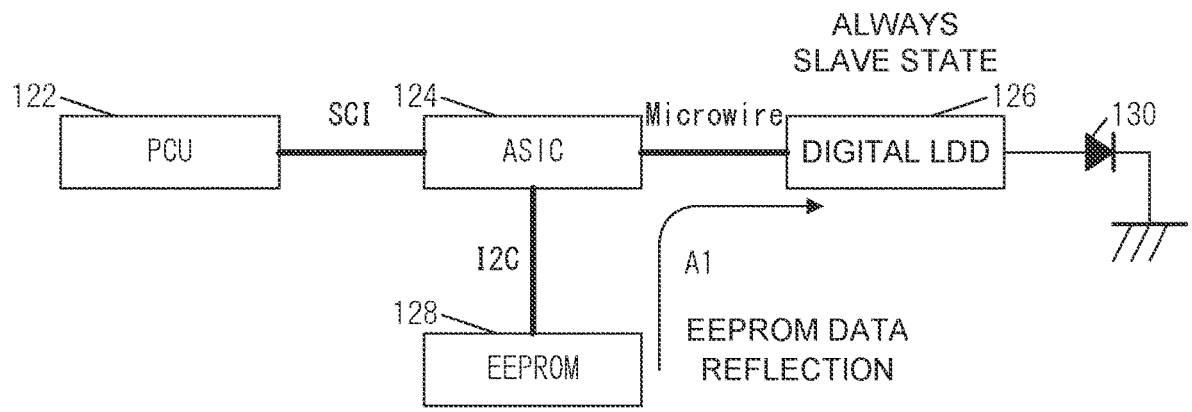
FIG. 5 is a block diagram illustrating a functional configuration of an optical scanning device according to the first embodiment.

FIG. 5 is a block diagram illustrating a functional configuration of the optical scanning device of the image forming apparatus 10. As illustrated in FIG. 5, the optical scanning device of the image forming apparatus 10 includes the PCU 122, the ASIC 124, the digital LDD 126, the EEPROM 128, and the light emitter 130.

The PCU 122 and the ASIC 124 communicate data and signals (data transfer) therebetween using, for example, a serial communication interface (SCI). Likewise, the ASIC 124 and the digital LDD 126 perform data transfer therebetween using, for example, Microwire. The ASIC 124 and the EEPROM 128 perform data transfer therebetween using, for example, I2C.

Note that the digital LDD 126 in the present embodiment is always in the slave state. When data stored in the EEPROM 128 is reflected in the digital LDD 126, the data stored in the EEPROM 128 is transferred from the EEPROM 128 to the digital LDD 126 via the ASIC 124 as indicated by A1 in FIG. 5.

The image forming apparatus 10 may have a configuration including a laser beam scanning unit (LSU) that includes the optical scanning device shown in FIG. 5. In addition to the optical scanning device, the LSU includes a polygon mirror (polarizer) that deflects a laser beam emitted from the light emitter 130 in the main scanning direction, an fθ lens that images the deflected laser beam on a surface of the image carrier 134, and other specific mirrors. In this case, the ASIC 124 may be referred to as LSUASIC.

Figure 6:
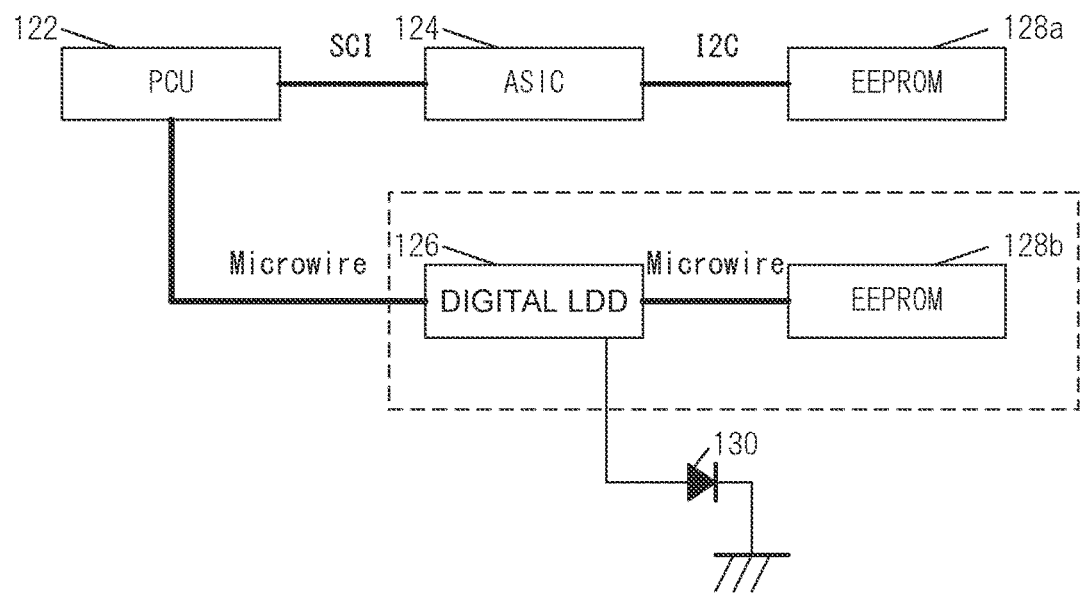
FIG. 6 is a block diagram illustrating a functional configuration of a conventional optical scanning device.

Note that FIG. 6, which is a block diagram, shows a functional configuration of a conventional optical scanning device. The conventional optical scanning device requires dedicated EEPROM 128 (EEPROM 128*b*, corresponding to the storage device 200 in FIG. 3) for the initialization of the digital LDD 126 in addition to EEPROM 128 (EEPROM 128*a*) that contains data to be inputted to the ASIC 124. Furthermore, for the initialization of the digital LDD 126 in the conventional optical scanning device, the ASIC 124 needs to communicate with the digital LDD 126 using Microwire or the like to switch the digital LDD 126 between the master state and the slave state. Specifically, in the conventional optical scanning device, the digital LDD 126 needs to be in the master state (LDD master) during the initialization of the digital LDD 126, and the digital LDD 126 needs to be in the slave state (LDD slave) during a normal operation of the digital LDD 126. If the ASIC 124 does not have a Microwire-using communication function, therefore, the ASIC 124 needs to communicate with the PCU 122 using an SCI and transmit predetermined signals to the digital LDD 126 via the PCU 122 as shown in FIG. 6. The conventional optical scanning device therefore requires a harness between the ASIC 124, the PCU 122, and the digital LDD 126.

Employing the configuration shown in FIG. 5 instead of the above-described conventional configuration makes it possible to eliminate the dedicated EEPROM and the dedicated harness (for PCU connection/EEPROM connection), which are otherwise required for the initialization of the digital LDD 126. That is, a configuration enclosed by a dotted line in FIG. 6 can be omitted.

Figure 7A:
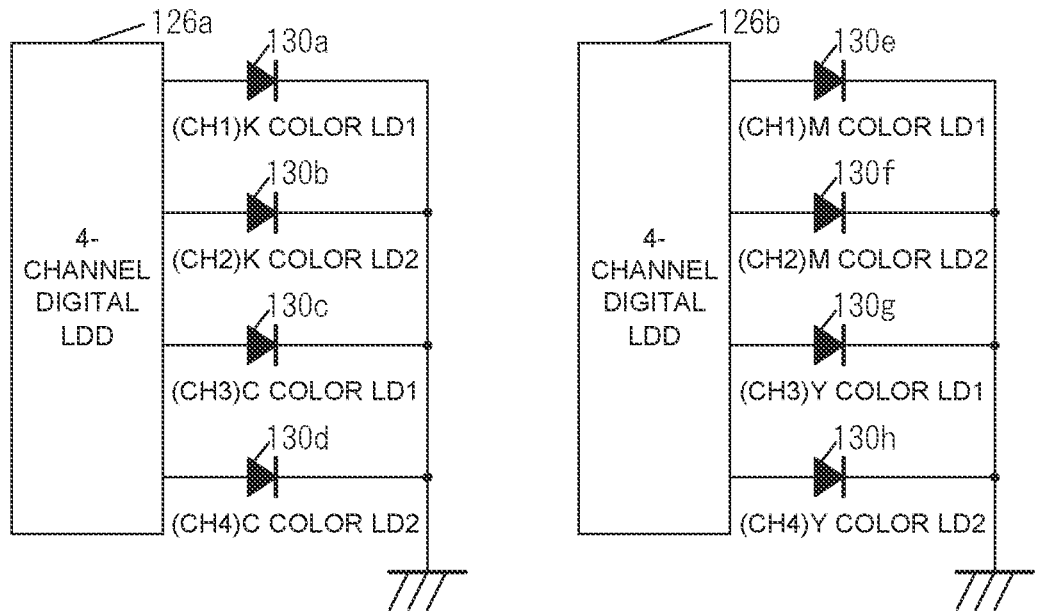
FIGS. 7A and 7B are diagrams showing examples of connection of the digital LDD and a light emitter according to the first embodiment.
Figure 7B:
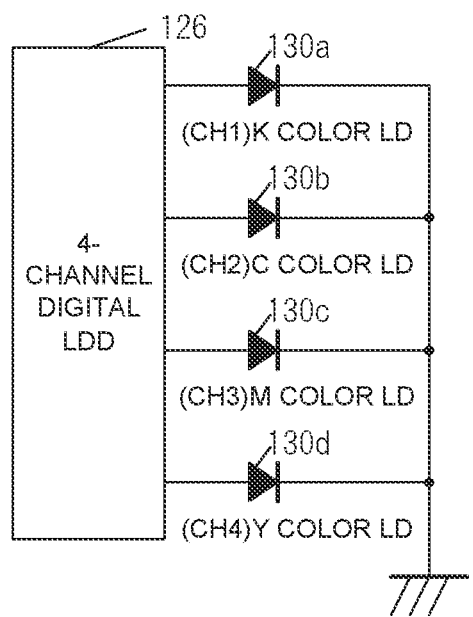

FIGS. 7A and 7B show examples of the configuration and connection of the digital LDD 126 and the light emitter 130 according to the present embodiment. FIG. 7A is a diagram illustrating a configuration of the digital LDD 126 and the light emitter 130 in an example in which the image forming apparatus 10 is a 2-beam model. The 2-beam model refers to a model that uses two laser beams to form an electrostatic latent image corresponding to one color component. In a case where the 2-beam model involves the use of a digital LDD 126 having four channels (4-channel digital LDD), eight light emitters 130 (light emitters 130*a* to 130*h*) are connected to two digital LDDs 126 (digital LDDs 126*a* and 126*b*). In this case, the light emitters 130*a* and 130*b* are used for formation of an electrostatic latent image with a K color component. The light emitters 130*c* and 130*d* are used for formation of an electrostatic latent image with a C color component. The light emitters 130*e* and 130*f* are used for formation of an electrostatic latent image with an M color component. The light emitters 130*g* and 130*h* are used for formation of an electrostatic latent image with a Y color component. The light emitters 130*a* to 130*d* are connected to CH1 to CH4 of the digital LDD 126*a*. The light emitters 130*e* to 130*h* are connected to CH1 to CH4 of the digital LDD 126*b*.

FIG. 7B is a diagram illustrating a configuration of the digital LDD 126 and the light emitter 130 in an example in which the image forming apparatus 10 is a 1-beam model. The 1-beam model refers to a model that uses one laser beam to form an electrostatic latent image corresponding to one color component. In a case where the 1-beam model involves the use of a digital LDD 126 having four channels, four light emitters 130 (light emitters 130*a* to 130*d*) are connected to one digital LDD 126. In this case, the light emitter 130*a* is used for formation of an electrostatic latent image with the K color component. The light emitter 130*b* is used for formation of an electrostatic latent image with the C color component. The light emitter 130*c* is used for formation of an electrostatic latent image with the M color component. The light emitter 130*d* is used for formation of an electrostatic latent image with the Y color component. The light emitters 130*a* to 130*d* are connected to CH1 to CH4 of the digital LDD 126.

Note that the configurations shown in FIGS. 7A and 7B are merely examples. For example, a 2-channel digital LDD(s) may be used instead of a 4-channel digital LDD(s).

1.2 Flow of Processing

Figure 8:
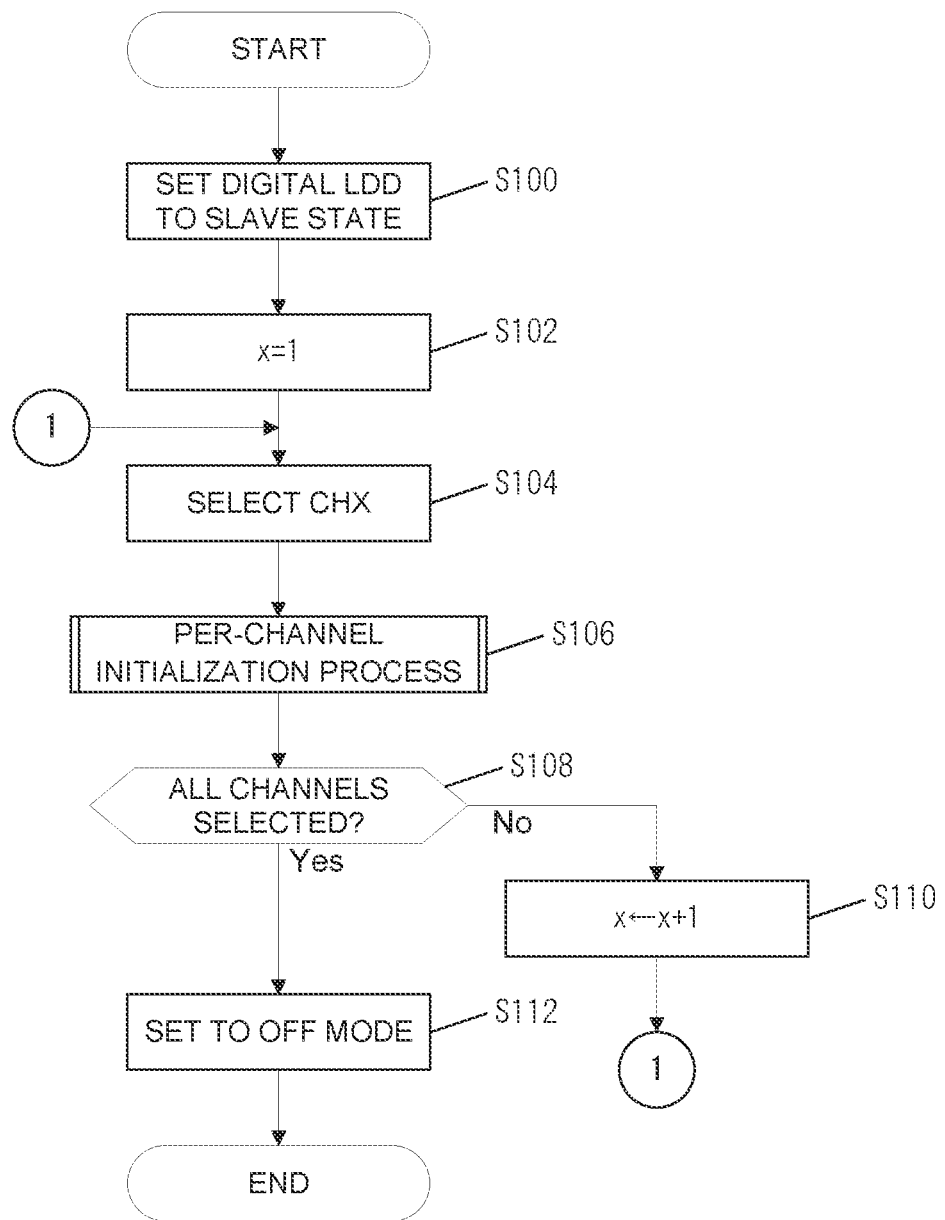
FIG. 8 is a flowchart showing a flow of main processing according to the first embodiment.
Figure 9:
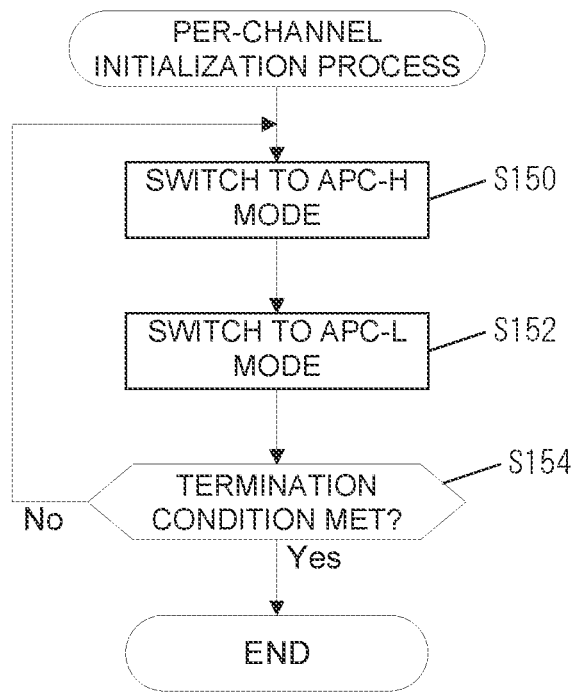
FIG. 9 is a flowchart showing a flow of a per-channel initialization process according to the first embodiment.

Referring to FIGS. 8 and 9, the following describes a flow of main processing to be performed during the initialization of the digital LDD 126 according to the present embodiment. According to the present embodiment, the initialization of each channel of the digital LDD 126 is performed through the ASIC 124 performing processes shown in FIGS. 8 and 9 based on the control of the controller 100.

1.2.1 Main Processing

First, a flow of the main processing shown in FIG. 8 will be described. The ASIC 124 sets the digital LDD 126 to the slave state (Step S100). That is, the ASIC 124 causes the digital LDD 126 to perform a normal operation. For example, the ASIC 124 outputs (applies) a signal (voltage) for setting the digital LDD 126 to the slave state to P0 of the digital LDD 126, so that P0=L.

Subsequently, the ASIC 124 assigns 1 to a variable x and selects CHx (xth channel) (Step S102→Step S104). Furthermore, the ASIC 124 performs a process for performing per-channel initialization (per-channel initialization process) on the selected channel (Step S106). Details of the per-channel initialization process are described below.

Subsequently, the ASIC 124 determines whether or not all the channels have been selected (Step S108). If not all the channels have been selected, the ASIC 124 increments the variable x by assigning a value x+1 to the variable x and returns to Step S104 (No in Step S108→Step S110→Step S104).

If all the channels have been selected, the ASIC 124 sets the operation mode of the digital LDD 126 to the OFF mode (standby mode) and terminates the processing shown in FIG. 8 (Yes in Step S108→Step S112).

1.2.2 Per-Channel Initialization Process

Referring to FIG. 9, the following describes a flow of the per-channel initialization process. The ASIC 124 switches the operation mode of the digital LDD 126 to the APC-H mode for the channel selected in Step S104 in FIG. 8 (Step S150). For example, the ASIC 124 outputs (applies) predetermined signals (voltages) to P1 to P5 so as to set the operation mode of the digital LDD 126 to the APC-Hx mode. Accordingly, the digital LDD 126 detects the beam intensity in the APC-H mode and executes a specific APC sequence for the channel selected in Step S104 in FIG. 8.

Subsequently, the ASIC 124 switches the operation mode of the digital LDD 126 to the APC-L mode for the channel selected in Step S104 in FIG. 8 (Step S152). For example, the ASIC 124 outputs (applies) predetermined signals (voltages) to P1 to P5 so as to set the operation mode of the digital LDD 126 to the APC-Lx mode. Accordingly, the digital LDD 126 detects the beam intensity in the APC-L mode.

Subsequently, the ASIC 124 determines whether or not a termination condition for terminating the per-channel initialization process is met (Step S154). Examples of termination conditions will be given below.

(1) The operation mode has been changed to the APC-H mode (or the APC-L mode) a predetermined number of times.

(2) A predetermined period of time has elapsed since the start of the process shown in FIG. 9.

(3) The amount of change in the setting of the LD beam intensity or the bias current is less than or equal to a predetermined amount.

The ASIC 124 determines that the termination condition is met as long as at least one of the conditions listed above is met.

If the termination condition is not met, the ASIC 124 returns to Step S150 (No in Step S154→Step S150). As described above, the ASIC 124 alternates the operation mode of the digital LDD 126 between the APC-H mode for the channel selected in Step S104 in FIG. 8 and the APC-L mode for the selected channel. If the termination condition is met, the ASIC 124 terminates the process shown in FIG. 9 (Yes in Step S154).

As described above, the ASIC 124 switches the operation mode of the digital LDD 126 between the APC-H mode and the APC-L mode for each channel by performing the processes shown in FIGS. 8 and 9. Meanwhile, the digital LDD 126 executes the specific APC sequence, thereby setting the LD beam intensity, the bias current, and the like for the specific channel. Through the above, the ASIC 124 can cause the digital LDD 126 having a plurality of channels to perform the per-channel initialization.

That is, for the initialization of the digital LDD 126, the ASIC 124 sets the digital LDD 126 to the slave state and outputs predetermined signals to the digital LDD 126 instead of setting the digital LDD 126 to the master state. Thus, the ASIC 124 switches the operation mode of the digital LDD 126 and causes the digital LDD 126 to execute the specific APC sequence based on the beam intensity of the laser beam emitted by the light emitter 130 driven according to the operation mode. Through the above, the ASIC 124 causes the digital LDD 126 to perform channel-specific initialization. Furthermore, the ASIC 124 can cause the digital LDD 126 to complete the initialization of all the channels of the digital LDD 126 by repeating the channel-specific initialization.

1.3 Operation Example

Figure 10:
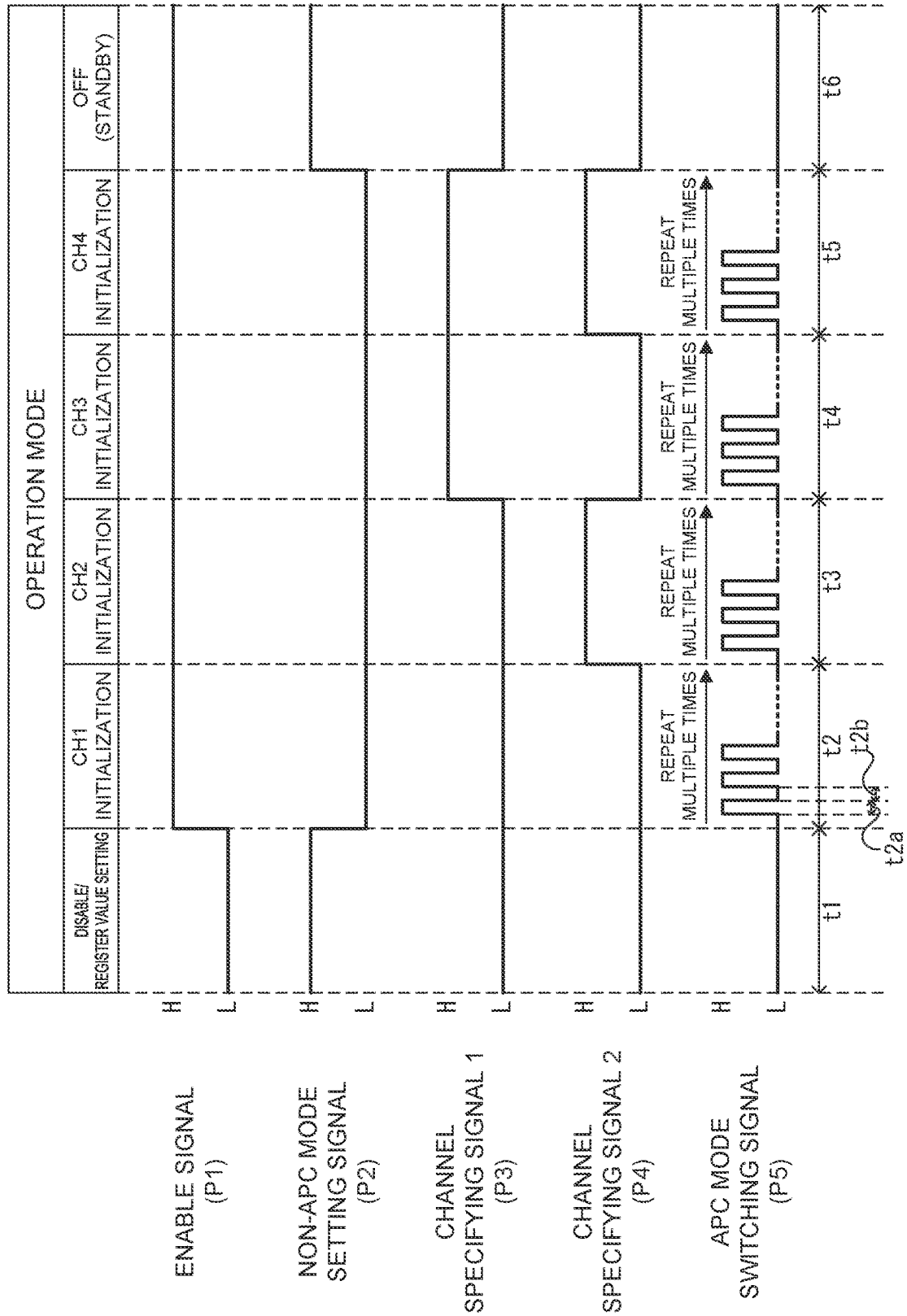
FIG. 10 is a diagram showing signals that are inputted to the digital LDD according to the first embodiment.

Referring to FIG. 10, the following describes signals that are outputted from the ASIC 124 and inputted to the digital LDD 126 during the initialization of the digital LDD 126 according to the present embodiment. FIG. 10 is a diagram showing signals (H or L) that are outputted from the ASIC 124 to P1 to P5 of the digital LDD 126 and operation modes of the digital LDD 126 corresponding to the signals.

t1 in FIG. 10 shows signals (P1=L) that are outputted from the ASIC 124 to the digital LDD 126 in order to set the operation mode of the digital LDD 126 to the DISABLE mode. At this time, the ASIC 124 may read data from the EEPROM 128 and set a predetermined value in the register of the digital LDD 126 based on the data.

t2 in FIG. 10 shows signals (P1=H, P2=L, P3=L, and P4=L) that are outputted from the ASIC 124 to the digital LDD 126 in order to set the operation mode of the digital LDD 126 to the CH1 initialization mode. In particular, t2a in FIG. 10 shows a signal (P5=H) for setting the operation mode of the digital LDD 126 to the APC-H mode for CH1 (APC-H1), and t2b in FIG. 10 shows a signal (P5=L) for setting the operation mode of the digital LDD 126 to the APC-L mode for CH1 (APC-L1).

The operation mode of the digital LDD 126 is repeatedly switched between the APC-H1 mode and the APC-L1 mode. As a result, a laser beam is emitted from the light emitter 130 according to the operation mode, and the initialization of CH1 is performed based on the beam intensity of the laser beam emitted. As described above, an APC sequence (specific APC sequence) for a specific channel is executed.

(3) CH2 initialization mode, CH3 initialization mode, and CH4 initialization mode t3 in FIG. 10 shows signals (P1=H, P2=L, P3=L, and P4=H) that are outputted from the ASIC 124 to the digital LDD 126 in order to set the operation mode of the digital LDD 126 to the CH2 initialization mode. Likewise, t4 in FIG. 10 shows signals (P1=H, P2=L, P3=H, and P4=L) for setting the operation mode of the digital LDD 126 to the CH3 initialization mode. t5 in FIG. 10 shows signals (P1=H, P2=L, P3=H, and P4=H) for setting the operation mode of the digital LDD 126 to the CH4 initialization mode. The description of t1 also applies to t3, t4, and t5 in FIG. 10. That is, the ASIC 124 repeatedly outputs, to the digital LDD 126, a signal (P5=H) for setting the operation mode of the digital LDD 126 to the APC-H mode for CHx (APC-Hx) and a signal (P5=L) for setting the operation mode of the digital LDD 126 to the APC-L mode for CHx (APC-Lx). Thus, the initialization of CH2, CH3, and CH4 is performed.

t6 in FIG. 10 shows signals (P1=H and P2=H) that are outputted from the ASIC 124 to the digital LDD 126 in order to set the operation mode of the digital LDD 126 to the OFF (standby) mode. In the OFF mode, the digital LDD 126 outputs a predetermined LD current in each channel of the digital LDD 126 according to data (LVDS) inputted.

As described above, the present embodiment allows a desired channel to be initialed (slave initialization) by appropriately combining the signals H and L that are inputted to P2, P3, and P4. Furthermore, the present embodiment allows errors in digital computation related to the bias current and the switching current to be absorbed by repeatedly switching the signal that is inputted to P5 between H and L, and thus switching the operation mode of the digital LDD 126 between the APC-H mode and the APC-L mode. That is, the ASIC 124 ensures that the initialization of each channel of the digital LDD 126 can be performed appropriately by switching the operation mode of the digital LDD 126 between the APC-H mode and the APC-L mode multiple times.

Note that the initialization of the digital LDD 126 may be performed automatically when the power of the image forming apparatus 10 is turned on or may be performed based on a user's operation. The initialization of the digital LDD 126 performed as described above allows the user to use the image forming apparatus 10 with the optical scanning device in an appropriately operable state.

As described above, the optical scanning device according to the present embodiment includes a digital laser driver that operates in the master state during initialization and that operates in the slave state during a normal operation. In this optical scanning device, the laser driver is set to the slave state even during the initialization of the laser driver. The optical scanning device according to the present embodiment performs initialization of a specific channel by executing a specific APC sequence when the laser driver is in the slave state. The initialization of the digital LDD, which is a laser driver, can be performed without changing the state of the digital LDD fixed in the slave state, allowing for simplified communication control in the optical scanning device.

Furthermore, the ASIC has a Microwire-using communication function, eliminating the need for communication via the PCU to control the laser driver, and thus reducing the number of harnesses to be required. Furthermore, since the initialization can be performed without changing the state of the laser driver fixed in the slave state, it is possible to eliminate EEPROM dedicated to the laser driver, which is otherwise required for the initialization. As a result, a cost reduction can be achieved.

Furthermore, the optical scanning device according to the present embodiment is enabled to irradiate a plurality of image carriers (photoreceptor drums) with laser beams using a single laser driver by connecting a plurality of light emitters to the single laser driver. This configuration allows for a reduction in the number of laser drivers necessary for the optical scanning device, a reduction in the substrate area of the optical scanning device, and a reduction in cost.

2. Second Embodiment

Figure 11:
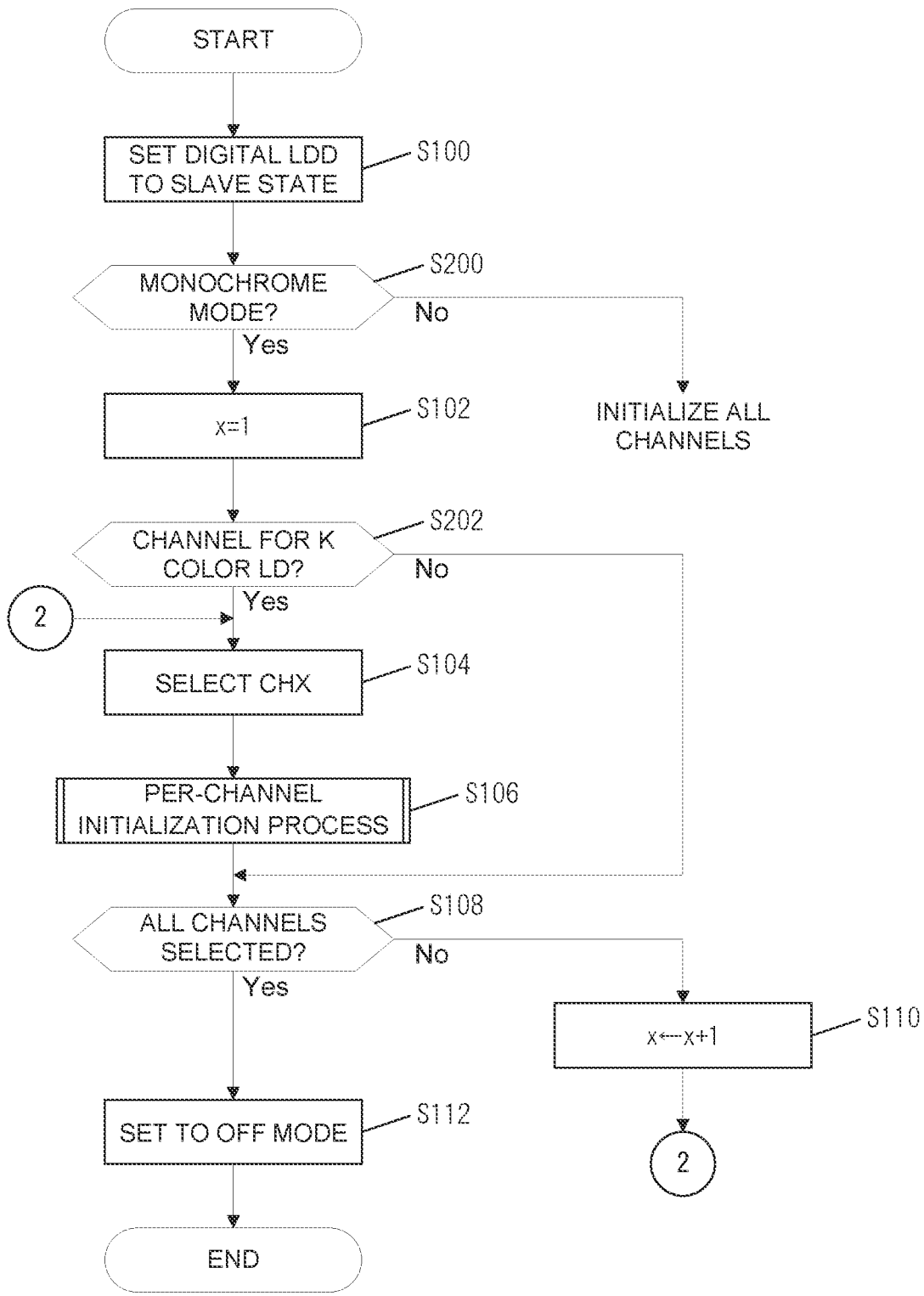
FIG. 11 is a flowchart showing a flow of main processing according to a second embodiment.

The following describes a second embodiment. An optical scanning device according to the second embodiment can perform a process for initializing only a specific channel among all channels of a digital LDD thereof in addition to the processes described in the first embodiment. The present embodiment is implemented by replacing FIG. 8 according to the first embodiment with FIG. 11. In FIG. 11, the same processes as in FIG. 8 are labeled with the same reference signs as in FIG. 8, and description thereof will be omitted.

Referring to FIG. 11, the following describes main processing to be performed by the ASIC 124 according to the present embodiment. In the present embodiment, the ASIC 124 determines whether or not the output mode is a monochrome mode (Step S200) after setting the digital LDD 126 to the slave state. When the output mode is the monochrome mode, the image forming apparatus 10 (color image forming apparatus) capable of color output performs monochrome output rather than color output. That is, the monochrome mode refers to a mode in which an image is formed using only a K color toner.

If the output mode is the monochrome mode, the ASIC 124 assigns 1 to the variable x (Yes in Step S200→Step S102) and determines whether or not CHx is a channel for a K color LD (Step S202). That is, the ASIC 124 determines whether or not CHx is a channel for outputting LD current to a light emitter 130 for use in formation of an electrostatic latent image with the K color component.

If CHx is the channel for the K color LD, the ASIC 124 selects CHx so determined (Yes in Step S202→Step S104) and performs the per-channel initialization process on CHx selected (Step S106). Note that if the ASIC 124 determines in Step S202 that CHx is not the channel for the K color LD, the ASIC 124 omits the per-channel initialization process on CHx so determined, by omitting the processes in Steps S104 and S106.

Subsequently, the ASIC 124 performs the processes in Step S108 to Step S112. Thus, the ASIC 124 can cause the digital LDD 126 to perform the channel initialization only on the channel for the K color LD.

Note that if the ASIC 124 determines in Step S200 that the output mode is a color mode, the ASIC 124 may cause the initialization to be performed on all the channels as in the first embodiment (No in Step S200).

Although the processing according to the present embodiment is described using a case where the initialization is performed on the channel for the K color LD, the processing is not limited as such. The ASIC 124 may select a specific channel to be initialized based on, for example, the status of the image forming apparatus 10 or settings of the image forming apparatus 10.

As described above, the optical scanning device according to the present embodiment can execute an APC sequence on a channel-by-channel basis (specific APC sequence). In a case where the image forming apparatus is a color image forming apparatus and is being in the monochrome mode, for example, the optical scanning device according to the present embodiment can perform the initialization only on the channel for the K color LD and refrain from performing the initialization on the channels for the other LDs (C, M, and Y color LDs).

Generally, in initialization, the initial APC sequence for initializing all the channels is executed, and thus the operation mode of the digital LDD is switched between the APC-H mode and the APC-L mode, so that laser beams are emitted. In this case, it is impossible to prevent deterioration of the photoreceptors due to exposure to light at the same locations (sub-scanning sides) on the photoreceptors, resulting in shortening of the lives of the photoreceptors. However, rotating the photoreceptors for the purpose of preventing deterioration of the photoreceptors increases power consumption in the monochrome mode. It is therefore preferable that the initialization (initial APC sequence) not be performed on channels other than the channel for the K color LD in the monochrome mode of the color image forming apparatus. Conventionally, for initialization of a digital LDD, the digital LDD is set to the master state, and an initial APC sequence for initializing all the channels is automatically executed. In the case of a color image forming apparatus in which laser diodes corresponding to a plurality of colors are connected to a single laser driver, therefore, it is impossible to initialize only a channel to be used for formation of an electrostatic latent image on a photoreceptor for a black color (K color), that is, is it is impossible to adapt the initialization for the monochrome mode.

To address the above-described problem, the optical scanning device according to the present embodiment makes it possible to perform initialization on a specific channel by executing a specific APC sequence while keeping the digital LDD in the slave state even during the initialization. As such, the optical scanning device according to the present embodiment makes it possible to connect a plurality of light emitters to a single laser driver and to irradiate respective photoreceptor drums with laser beams. When the initialization of the digital LDD is performed in the monochrome mode of the color image forming apparatus, therefore, only initialization of the channel for the K color LD is performed. In this case, the optical scanning device according to the present embodiment can prevent the photoreceptors corresponding to the C, M, and Y colors from being exposed to laser beams by preventing the initialization of the channels for the C, M, and Y color LDs from being performed along with the initialization of the channel for the K color LD. As a result, the optical scanning device according to the present embodiment can have a configuration in which a single laser driver is used for a plurality of light emitters that irradiate respective photoreceptor drums with laser beams, allowing for a further reduction in the substrate area and a reduction in cost.

3. Third Embodiment

The following describes a third embodiment. According to the third embodiment, initialization of the laser scanning unit is performed in addition to the processes described in the first embodiment.

The controller 100 of the present embodiment performs initialization of the laser scanning unit in parallel with the initialization of the digital LDD 126 of the optical scanning device. For example, as the initialization of the laser scanning unit, the controller 100 causes in advance the polygon mirror to start rotating to be in steady rotation. Thus, the controller 100 can achieve both the initialization of the digital LDD 126 and the steady rotation of the polygon mirror, thereby reducing the warm-up time of the image forming apparatus 10.

As described above, according to the present embodiment, the initialization of the laser scanning unit is performed in parallel with the initialization of the digital LDD, thereby reducing the warm-up time.

4. Modification Example

The present disclosure is not limited to the foregoing embodiments, and various modifications may be made. That is, the technical scope of the present disclosure also includes an embodiment obtained by combining technical measures modified as appropriate without departing from the spirit of the present disclosure.

Although some parts of the foregoing embodiments are described separately for convenience of explanation, it is needless to say that such embodiments may be combined and implemented within a technically allowable range. For example, the present disclosure may be implemented through a combination of the second embodiment and the third embodiment. In this case, it is possible to appropriately perform the initialization of the channel corresponding to the K color in the monochrome mode of the color image forming apparatus and to perform the initialization of the polygon mirror in parallel with the channel initialization.

The program(s) that operates on each of the devices in the foregoing embodiments is a program that controls the CPU or the like (program that causes a computer to function) so as to implement the functions according to the foregoing embodiments. The information handled by these devices is temporarily accumulated in a temporary storage device (for example, RAM)) during processing, is then stored in various storage devices such as read only memory (ROM) and an HDD, and is read, corrected, and written by the CPU as needed.

Here, a recording medium that stores the program may be, for example, any of a semiconductor medium (for example, ROM and a non-volatile memory card), an optical recording medium/magneto-optical recording medium (for example, Digital Versatile Disc (DVD)), a Magneto Optical Disc (MO), a Mini Disc (MD), a Compact Disc (CD), and a Blu-ray (registered trademark) Disc (BD)), and a magnetic recording medium (for example, a magnetic tape and a flexible disk). Furthermore, not only are the functions of the foregoing embodiments implemented through execution of the loaded program, but the functions of the present disclosure may also be implemented through processing performed in cooperation with, for example, an operating system or other application programs on the basis of instructions of the program.

For market distribution, the program may be stored and distributed in a portable recording medium or transferred to a server computer connected via a network such as the Internet. In this case, a storage device of the server computer is obviously included in the present disclosure.

What is claimed is:

1. An optical scanning device comprising:
a light emitter that emits a laser beam;
a driver that operates, depending on a signal inputted thereto, in a master state in which the driver performs an initialization by reading data from a storage device or in a slave state in which the driver drives the light emitter according to an operation mode corresponding to the signal; and
a signal outputter that outputs the signal to the driver, wherein
for the initialization of the driver, the signal outputter outputs a signal for setting the driver to the slave state and setting the operation mode to a specific operation mode,
the driver performs the initialization based on a beam intensity of the laser beam emitted from the light emitter driven according to the operation mode based on the signal outputted from the signal outputter,
when the driver is in the slave state, the signal outputter alternately and repeatedly outputs, to the driver, a signal corresponding to a first operation mode in which the driver drives the light emitter so that the beam intensity is a first beam intensity, and a signal corresponding to a second operation mode in which the driver drives the light emitter so that the beam intensity is a second beam intensity that is smaller than the first beam intensity, and
the driver performs the initialization based on the first beam intensity and the second beam intensity.

2. The optical scanning device according to claim 1, wherein
the driver has a plurality of channels that each supplies, to a corresponding light emitter of a plurality of light emitters, including the light emitter, a drive current that causes the corresponding light emitter to emit the laser beam,
the driver is switchable between the first operation mode and the second operation mode for each of the plurality of channels, and
the signal outputter outputs, to the driver, a signal for switching the operation mode to the first operation mode and a signal for switching the operation mode to the second operation mode for each of the plurality of channels when the driver is in the slave state.

3. The optical scanning device according to claim 2, wherein
the signal outputter alternately and repeatedly outputs, to the driver, the signal for switching the operation mode to the first operation mode and the signal for switching the operation mode to the second operation mode for a specific channel among the plurality of channels when the driver is in the slave state, and
the driver performs the initialization on the specific channel.

4. An image forming apparatus comprising:
a light emitter that emits a laser beam;
a driver that operates, depending on a signal inputted thereto, in a master state in which the driver performs an initialization by reading data from a storage device or in a slave state in which the driver drives the light emitter according to an operation mode corresponding to the signal;
a signal outputter that outputs the signal to the driver;
an image carrier that carries an electrostatic latent image formed as a result of the image carrier being irradiated with the laser beam; and
a fixer that fixes, onto a recording paper, an image based on the electrostatic latent image, wherein
for the initialization of the driver, the signal outputter outputs a signal for setting the driver to the slave state and setting the operation mode to a specific operation mode,
the driver performs the initialization based on a beam intensity of the laser beam emitted from the light emitter driven according to the operation mode based on the signal outputted from the signal outputter,
when the driver is in the slave state, the signal outputter alternately and repeatedly outputs, to the driver, a signal corresponding to a first operation mode in which the driver drives the light emitter so that the beam intensity is a first beam intensity, and a signal corresponding to a second operation mode in which the driver drives the light emitter so that the beam intensity is a second beam intensity that is smaller than the first beam intensity, and
the driver performs the initialization based on the first beam intensity and the second beam intensity.

5. A control method for a driver device that operates, depending on a signal inputted thereto, in a master state in which the driver device performs an initialization by reading data from a storage device or in a slave state in which the driver device drives a light emitter, which emits a laser beam, according to an operation mode corresponding to the signal, the control method comprising:
outputting, for the initialization of the driver device, a signal for setting the driver device to the slave state and setting the operation mode to a specific operation mode;
causing the driver device to perform the initialization based on a beam intensity of the laser beam emitted from the light emitter driven according to the operation mode based on the signal outputted;
when the driver device is in the slave state, alternately and repeatedly outputting, to the driver device, a signal corresponding to a first operation mode in which the driver device drives the light emitter so that the beam intensity is a first beam intensity, and a signal corresponding to a second operation mode in which the driver device drives the light emitter so that the beam intensity is a second beam intensity that is smaller than the first beam intensity; and causing the driver device to perform the initialization based on the first beam intensity and the second beam intensity.

\* \* \* \* \*